Figure 1:
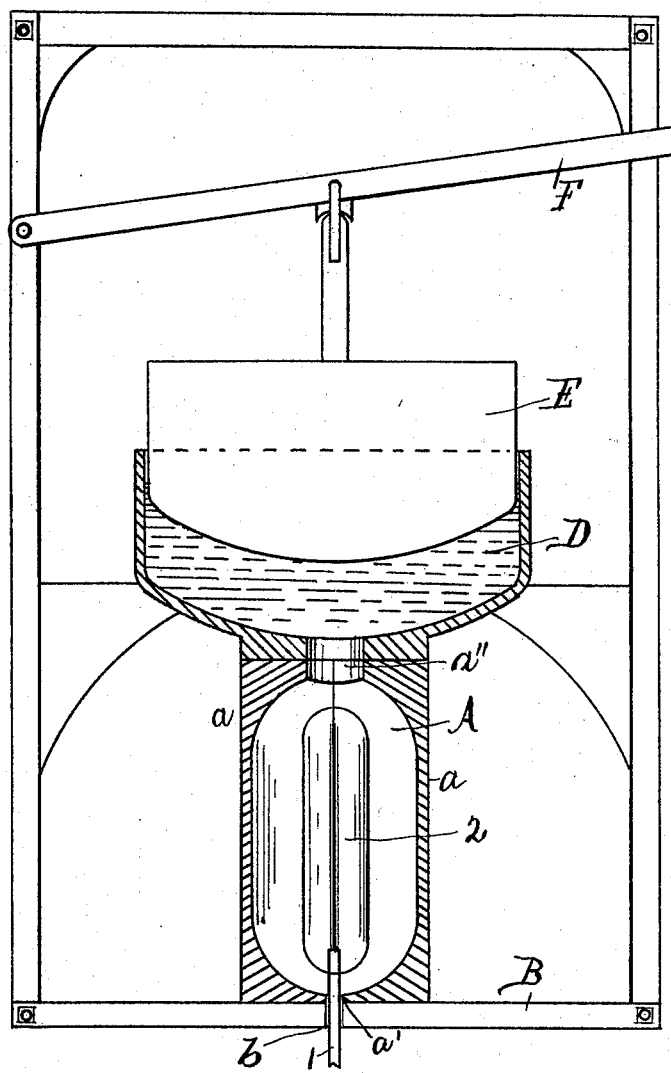

(No Model.)

A. A. HOUGHTON.
PROCESS OF AND APPARATUS FOR MANUFACTURING GLASS TUBING.

No. 586,188. Patented July 13, 1897.

Witnesses
Baylies C. Clark
W. G. Rhoades.

Inventor
Arthur A. Houghton
by
his Attorney

UNITED STATES PATENT OFFICE.

ARTHUR AMORY HOUGHTON, OF CORNING, NEW YORK.

PROCESS OF AND APPARATUS FOR MANUFACTURING GLASS TUBING.

SPECIFICATION forming part of Letters Patent No. 586,188, dated July 13, 1897.

Application filed March 22, 1897. Serial No. 628,671. (No model.)

*To all whom it may concern:*

Be it known that I, ARTHUR AMORY HOUGHTON, a citizen of the United States, residing at Corning, in the county of Steuben and State of New York, have invented certain new and useful Improvements in Processes of and Apparatus for Manufacturing Glass Tubing; and I do hereby declare the following to be a full, clear, and exact description of the invention, such as will enable others skilled in the art to which it appertains to make and use the same.

My invention relates to a process of and apparatus for the manufacture of glass tubing, it being especially applicable to tubing in which a uniform bore is desired, such as thermometer-tubing, and to that form thereof commonly called "lens-front tubing," in which the tubing is formed with converging faces at its front, forming a lens, the bore of the tubing being at the focus of the lens thus formed, whereby the small column of mercury used in clinical thermometers for greater sensitiveness is apparently rendered larger and is more readily read.

Heretofore in the manufacture of tubing, after the workman has formed a "cylinder" of glass with thin walls upon the end of his blowpipe, he has inserted this cylinder in a pot of molten glass, and having caught thereon a greater or less quantity of the molten material he has endeavored by rolling, swinging, and working to render the mass upon the end of his pipe symmetrical. When the "blank" so formed has solidified, it is reheated to near its melting-point and drawn out into a tube, as is well known.

The above statement of the present state of the art applies particularly to the method of making ordinary tubing; but the method of making ordinary thermometer-tubing is in all essential steps the same, the difference being that the "bore" or central cavity of the cylinder from which the last-named class of tubing is to be made is made of less diameter and the walls of the blank thicker to provide for the smaller diameter of the bore of the finished tubing and the greater thickness of the walls thereof.

In the present method of making lens-front tubing an additional step is involved in that the heated blank before being drawn into the tube is laid in a V-shaped trough, with its sides inclined at approximately the same angle as it is desired to give the finished tube, whereby a corresponding cross-section is sought to be imparted to the blank.

These several processes are all defective, however, in that it is difficult to evenly distribute the molten glass upon the cylinder without distortion of the bore thereof, while at the same time any twisting motion given to the pipe while the cylinder is within the pot in the step of covering it with the molten glass often causes a twisting of the cylinder and a further distortion of the bore thereof. As the thickness of the walls of the finished tube and the diameter of the bore thereof directly depend upon the thickness of the walls of the blank and of the diameter of the bore thereof, it will be obvious that such inequalities in the walls or bore of the former cause corresponding defects in the tube finished therefrom, so as to necessitate the rejection of a large part of the finished product when uniformity is desired.

Additional trouble is met with in securing uniformity in the making of lens-front tubing in the manner before described owing to the difficulty experienced in seating the heated blank in the V-trough, for if not properly seated not only will the refracting front faces of the blank be imperfect, but the central bore will not be uniform and straight nor in the focus of the lens formed by the refracting-faces. Moreover, it is impossible to so locate the blank within the trough as to insure the bore being in the focus of the refracting-faces of the tube formed therefrom, as any variation in thickness of the walls of the blank will move the bore out of the focus. By my invention these difficulties in obtaining uniform tubing of any desired shape are avoided and at the same time the labor of making the tubes lessened.

Figure 2:
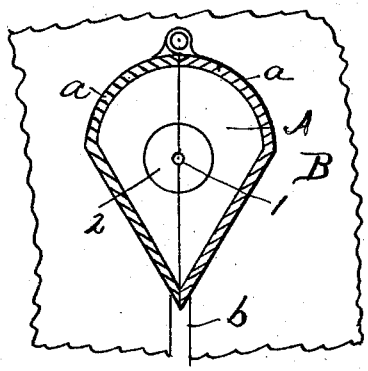

Referring to the accompanying drawings, in which corresponding parts are designated by similar marks of reference, Figure 1 is a vertical section of apparatus invented by me for carrying out my improved process. Fig. 2 is a cross-section thereof on line *x x*, showing a form of mold adapted to the manufacture of blanks for lens-front tubing.

In carrying out my process the workman first forms in the usual manner on the end of his pipe a cylinder of glass and casts thereon while under pressure a covering of glass to form the blank. As a convenient mechanism for effecting such casting I have invented the device illustrated in the accompanying drawings, and although I do not limit myself in carrying out my process to the use of such a device particular reference will be had thereto in more fully describing the nature of my improved process.

The cylinder formed as above described is inserted in a mold A, composed of two hinged halves $a\ a$, the interior of the mold having the same configuration in cross-section as desired for the finished tube, while a hole $a'$ is formed in the bottom of the mold where the two halves come together and through which the pipe 1, carrying the cylinder 2 on its end, is inserted, the mold being mounted upon a platform B, provided with a slot $b$ to permit the insertion of the pipe 1. A gateway $a''$ is formed between the upper portion of the two halves of the mold, while resting upon the upper portion of the hinged halves and making a tight joint therewith when the latter is closed is the fount D, having an opening in its bottom registering with the gateway $a''$ of the mold. The cylinder of glass having been properly centered in the mold and the two halves fastened together the fount D is filled with molten glass, and a plunger E, actuated by any suitable mechanism (such as the lever F) and fitting snugly within the fount, is forced down therein upon the molten glass, forcing the latter through the gateway and into the mold and around the cylinder, to which, in its molten state and under the influence of pressure, it unites, at the same time taking a configuration of the mold, thus forming a true and uniform blank, which when taken from the mold is drawn out into tubing in the usual manner.

By my invention it will be seen that the cylinder when once properly formed is not subject to deformation while being converted into a blank, as is the case in the method now in use, as before stated, and that the blank formed by casting a layer of glass upon the outside of a cylinder can be readily made of uniform thickness at all points, and that by varying the size and configuration of the mold blanks having walls of different thicknesses and of varying shapes may be formed, thus resulting in the uniformity of the tubing produced therefrom and with a simplification of the process by which it is obtained, while by a proper location of the hole $a'$ in the bottom of the mold the bore of the cylinder upon the end of the tube inserted therethrough may be accurately located within the focus of the refracting-faces of the finished tube formed from the blank.

It is of course obvious that before placing the cylinder in the mold a strip of white glass may be placed upon one side thereof, as is now usually done, to act as a reflector for the mercury in the completed thermometer-tube.

Having thus described my invention, what I claim, and desire to secure by Letters Patent of the United States, is—

1. The hereinbefore-described process of making glass tubing which consists in making a cylinder, casting under pressure an outer layer of glass upon the cylinder, and drawing out the blank thus formed into a tube, substantially as described.

2. The hereinbefore-described process of making glass tubing which consists in making a cylinder, casting under pressure an outer layer of glass upon the cylinder of the same configuration in cross-section as the desired cross-section of the finished tubing, and drawing out the blank thus formed into a tube, substantially as described.

3. A mold to be employed in the forming of blanks from cylinders adapted to receive the cylinder and provided with an aperture for the passage of the pipe carrying the cylinder, and having a gateway for the admission of molten glass, substantially as described.

4. In a device to be employed in the manufacture of blanks from cylinders, the combination with a mold adapted to receive the cylinder and provided with an aperture for the passage of the pipe carrying the cylinder, a fount for molten glass discharging into the mold, a plunger, and means for forcing the plunger upon the molten glass within the fount, substantially as described.

In testimony whereof I affix my signature in presence of two witnesses.

ARTHUR AMORY HOUGHTON.

Witnesses:
WALDO W. WILLARD,
E. B. SEYMOUR.